United States Patent
Brule et al.

(10) Patent No.: US 10,471,677 B2
(45) Date of Patent: Nov. 12, 2019

(54) MULTILAYER STRUCTURE COMPRISING CONTINUOUS FIBERS FOR TRANSPORTING HEAT TRANSFER FLUID

(71) Applicant: ARKEMA FRANCE, Colombes (FR)

(72) Inventors: Benoît Brule, Beaumont-le-Roger (FR); Nicolas Dufaure, Bernay (FR); Estelle Meurice Pierrat, Corneville-sur-Risle (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/780,089

(22) PCT Filed: Dec. 14, 2016

(86) PCT No.: PCT/FR2016/053412
§ 371 (c)(1),
(2) Date: May 30, 2018

(87) PCT Pub. No.: WO2017/103466
PCT Pub. Date: Jun. 22, 2017

(65) Prior Publication Data
US 2018/0361699 A1 Dec. 20, 2018

(30) Foreign Application Priority Data
Dec. 15, 2015 (FR) ..................... 15 62378

(51) Int. Cl.
| | |
|---|---|
| B32B 1/08 | (2006.01) |
| B32B 27/12 | (2006.01) |
| B32B 27/30 | (2006.01) |
| B32B 27/32 | (2006.01) |
| B29C 70/32 | (2006.01) |
| C09K 5/04 | (2006.01) |
| F16L 11/04 | (2006.01) |
| B32B 7/04 | (2019.01) |

(Continued)

(52) U.S. Cl.
CPC ............... *B32B 1/08* (2013.01); *B29C 70/32* (2013.01); *B32B 5/024* (2013.01); *B32B 7/04* (2013.01); *B32B 27/08* (2013.01); *B32B 27/12* (2013.01); *B32B 27/18* (2013.01); *B32B 27/20* (2013.01); *B32B 27/306* (2013.01); *B32B 27/32* (2013.01); *B32B 27/34* (2013.01); *B32B 37/153* (2013.01); *C09K 5/04* (2013.01); *F16L 11/04* (2013.01); *B32B 2260/021* (2013.01); *B32B 2260/046* (2013.01); *B32B 2262/0261* (2013.01); *B32B 2262/0269* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2262/14* (2013.01); *B32B 2270/00* (2013.01); *B32B 2307/30* (2013.01); *B32B 2307/702* (2013.01); *B32B 2307/704* (2013.01); *B32B 2307/7242* (2013.01); *B32B 2307/7265* (2013.01); *B32B 2597/00* (2013.01); *B32B 2605/08* (2013.01); *F16L 2011/047* (2013.01)

(58) Field of Classification Search
CPC ............... B32B 1/08; B32B 2260/021; B32B 2260/046; B32B 2262/101; B32B 2307/7242; B32B 2307/7265; B32B 2597/00; B32B 2605/08; B32B 27/12; B32B 27/306; B32B 27/32; B32B 27/34; B32B 37/153; B32B 7/04; B32B 2262/0261; B32B 2262/0269; B32B 2262/10; B32B 2262/103; B32B 2262/105; B32B 2262/106; B32B 2262/14; B32B 2270/00; B32B 2307/30; B32B 2307/702; B32B 2307/704; B32B 27/08; B32B 27/18; B32B 27/20; B32B 5/024; C09K 5/04; F16L 11/04; F16L 2011/047

See application file for complete search history.

(56) References Cited

U.S. PATENT DOCUMENTS

| | | |
|---|---|---|
| 8,211,517 B2 | 7/2012 | Martens et al. |
| 2011/0183095 A1 | 7/2011 | Defilippi |

(Continued)

FOREIGN PATENT DOCUMENTS

| | | | |
|---|---|---|---|
| DE | 10 2008 037 490 A1 | | 5/2010 |
| EP | 1 717 022 A1 | | 11/2006 |

(Continued)

OTHER PUBLICATIONS

International Search Report (PCT/ISA/210) dated Mar. 23, 2017, by the French Patent Office as the International Searching Authority for International Application No. PCT/FR2016/053412.

(Continued)

*Primary Examiner* — Yan Lan
(74) *Attorney, Agent, or Firm* — Thomas F. Roland

(57) ABSTRACT

A tubular structure for transporting heat transfer fluid including at least: i) a layer (1) in contact with the fluid including at least one thermoplastic polymer P1 that is semicrystalline with Tm1 greater than or equal to 160° C., as determined according to the standard 1 1357-3 (2013) or amorphous with Tg1 greater than or equal to 100° C., as determined according to the standard 1 1357-2 (2013), said layer (1) containing no fibers, ii) a layer (2) including at least: (a) a thermoplastic polymer P2 that is semicrystalline, in particular a polyamide with Tm2 greater than or equal to 170° C. or amorphous with Tg2 greater than or equal to 100° C., or a polyolefin with Tm greater than 100° C.; (b) continuous fibers, the polymer P2 being identical to P1 or different from P1 in which case the polymers P1 and P2 adhere at least partially to one another.

26 Claims, No Drawings

(51) Int. Cl.
    *B32B 27/34*     (2006.01)
    *B32B 37/15*     (2006.01)
    *B32B 5/02*     (2006.01)
    *B32B 27/08*     (2006.01)
    *B32B 27/18*     (2006.01)
    *B32B 27/20*     (2006.01)

(56) References Cited

U.S. PATENT DOCUMENTS

| | | |
|---|---|---|
| 2011/0272854 A1 | 11/2011 | Elia et al. |
| 2013/0068338 A1 | 3/2013 | Shinoda et al. |

FOREIGN PATENT DOCUMENTS

| | | |
|---|---|---|
| EP | 2 578 391 A1 | 4/2013 |
| WO | 2014/125218 A1 | 8/2014 |
| WO | 2014/125219 A1 | 8/2014 |

OTHER PUBLICATIONS

Written Opinion (PCT/ISA/237) dated Mar. 23, 2017, by the French Patent Office as the International Searching Authority for International Application No. PCT/FR2016/053412.

MULTILAYER STRUCTURE COMPRISING CONTINUOUS FIBERS FOR TRANSPORTING HEAT TRANSFER FLUID

FIELD OF THE INVENTION

The present invention relates to a multilayer tubular structure comprising at least one internal layer and one second layer comprising in particular continuous fibers. The invention also relates to the use of this structure for transporting heat transfer fluid, in particular refrigerant fluid such as R134, R-1234yf or R-1234ze, in particular in the motor vehicle air-conditioning field.

TECHNICAL BACKGROUND

The transporting of heat transfer fluid, in particular refrigerant fluid, in vapor-compression circuits, such as those which are used in particular in motor vehicle air-conditioning, requires the use of multilayer structures that have a very specific combination of mechanical, thermal and chemical properties.

The elements of these circuits (and in particular the multilayer tubular structures) must in particular:

- be impermeable to the fluids transported and therefore have barrier properties with respect to these fluids (and in particular to fluorocarbon refrigerant compounds such as R134, R-1234yf or R-1234ze), and also to water and to oxygen;
- have chemical resistance to the fluids transported, and also to the compressor oils, to water and to oxygen, in order to avoid any excessive degradation over the long term;
- have sufficient mechanical strength (in particular bursting strength) but also sufficient flexibility in the case where the two ends of the tube are connected to parts that can move relative to one another (in particular in the motor vehicle air-conditioning field, where the constraints of bulkiness and assembly under the hood impose folding the tubular structures) and allow the damping of vibrations;
- have satisfactory heat resistance, given the fact that the fluids transported can be at a high temperature, and that the surrounding temperature can also be high (in particular in motor vehicle air-conditioning, the parts concerned possibly being arranged close to the engine).

At the current time, the tubular structures for transporting heat transfer fluids and in particular refrigerant fluids in motor vehicle air-conditioning comprise rigid metal portions (generally made of aluminum) and flexible portions made of multilayer tubes. Some of these multilayer tubes are known as "veneer" tubes; they successively comprise, from the inside to the outside, an internal barrier layer based on polyamide (or PA), an intermediate layer of elastomer of rubber type, a reinforcing braid and, finally, another layer of elastomer of rubber type.

In the commercially available models, polyamide-based internal layer can for example be a formulated PA 6 (polycaprolactam) (with or without plasticizer, with or without impact modifier, with or without stabilizer), a formulated copolyamide PA 6/66 (with or without plasticizer, with or without impact modifier, with or without stabilizer), or else an alloy of PA 6 or of PA 66 (polyhexamethylene adipamide) with polyolefins and functionalized polyolefins (product sold under the brand name Orgalloy®).

Moreover, document U.S. 2011/0183095 describes a tube or a seal for transporting heat transfer fluids in motor vehicle air-conditioning, comprising an internal layer based on PA 610 (polyhexamethylene sebacamide) and an external layer based on a polyamide such as a polyphthalamide, and preferably the seal is composed of PA 610 reinforced with fibers.

Document U.S. 2011/0272854 describes an article comprising an element composed of fiber-reinforced polyamide overmolded with another element composed of polyamide with optionally a tie between the two elements and where at least one of the polyamides is a semi-aromatic polyamide.

Document EP 1 717 022 relates to multilayer tubes for various applications, and more particularly for transporting fuel in motor vehicles, from the tank to the engine. These tubes comprise an intermediate layer of polyamide, for example of PA 610 (polyhexamethylene sebacamide) or PA 612 (polyhexamethylene dodecanamide).

Document WO 2014/125218 relates to the use of a layer consisting of a composition comprising a copolyamide of formula X/10T/Y for transporting heat transfer fluid in a vapor-compression circuit.

Document WO 2014/125219 relates to a thermoplastic structure comprising at least one layer consisting of a composition based on semi-aromatic copolyamide. The thermoplastic structure is in particular suitable for transporting heat transfer fluid (such as R-1234yf), in particular in the motor vehicle air-conditioning field.

There is a need to develop vapor-compression circuit elements, therefore tubular structures, for transporting transfer fluid, in particular refrigerant fluid such as R-1234yf or R-1234ze, which make it possible to satisfy the specifications in terms of properties of impermeability to the fluids transported (and in particular to refrigerant compounds such as R-1234yf or R-1234ze), and also to water and to oxygen, of chemical resistance to the fluids transported, and also to the compressor oils, water and oxygen, and of mechanical properties, optionally flexibility properties, and heat resistance properties, but especially to simplify and reduce these multilayer structures.

Indeed, the need to reduce weight is particularly felt in the motor vehicle air-conditioning field, more particularly when the heat transfer fluid is R-1234yf or R-1234ze, since it is a question of improving the overall environmental impact of the vehicle, that is to say the impact of the content and therefore of the heat transfer fluid, but more globally of the container, that is to say of the vehicle, and therefore of the structure transporting the heat transfer fluid.

There is moreover a need to simplify the processing of the vapor-compression circuit elements, in particular in motor vehicle air-conditioning.

SUMMARY OF THE INVENTION

The invention relates firstly to a tubular structure (all or part of the system) for transporting heat transfer fluid, in particular refrigerant fluid, comprising at least i) a layer (1) in contact with the fluid comprising at least one thermoplastic polymer P1 which is semi-crystalline with a $Tm_1$ greater than or equal to 160° C., in particular greater than or equal to 170° C., as determined according to the standard 11357-3 (2013), or which is amorphous with a $Tg_1$ greater than or equal to 100° C., preferably 120° C., in particular 140° C., as determined according to the standard 11357-2 (2013), said layer (1) being devoid of fibers, ii) a layer (2) comprising at least
  (a) one thermoplastic polymer P2 which is semi-crystalline, in particular a polyamide with a $Tm_2$ greater than or equal to 170° C., or which is amorphous with a $Tg_2$ greater than or equal to 100° C., or a polyolefin with a Tm greater than 100° C.;

(b) continuous fibers, the polymer P2 being identical to P1 or different than P1, in which case the polymers P1 and P2 adhere at least partially to one another.

For the purposes of the invention, an amorphous polyamide denotes a polyamide having only one glass transition temperature (low melting point (Tm)), or a polyamide with very low crystallinity, having a glass transition temperature and a melting point such that the enthalpy of crystallization during the cooling step at a rate of 20 K/min in Differential Scanning calorimetry (DSC) measured according to the standard ISO 11357-3 of 2013 is less than 30 J/g, in particular less than 20 J/g, preferably less than 15 J/g. The glass transition temperature (Tg) measured by DSC at a heating rate of 20 K/min according to the standard ISO 11357-2 of 2013 for these polyamides is greater than 75° C.

For the purposes of the invention, a semi-crystalline polyamide denotes a polyamide which has a melting point (Tm) by DSC according to the standard ISO 11357-3 of 2013, and an enthalpy of crystallization during the cooling step at a rate of 20 K/min in DSC measured according to the standard ISO 11357-3 of 2013 which is greater than 30 J/g, preferably greater than 40 J/g.

The expression "devoid of fibers" means that the layer P1 does not comprise short, long or continuous fibers, whether they are mineral fibers, polymeric or polymer fibers, or mixtures of the abovementioned fibers.

The expression "continuous fibers" refers to continuous fibrous materials (in particular glass fiber or carbon fiber). These "continuous fibers" are subsequently impregnated with the polymer P2 (by means of a method of impregnation of unidirectional fibers by passing these fibers, continuously, in a fluidized bed, an aqueous dispersion, by depositing polymer powder or else by projecting a polymer powder), then the assembly is calendered and heated so as to form a unidirectional prepreg.

The fibers may or may not be oriented in the direction of the layer of the tubular structure.

It would not be a departure from the context of the invention if the continuous fibers in the impregnated unidirectional fibers were to be replaced with entangled continuous fibers (for example a fabric) which are subsequently impregnated (for example by powdering and then heating) with P2.

The diameter of the fibers depends on the type of fiber used and is from 3 to 50 μm.

The expression "P1 and P2 adhere at least partially to one another" means that P1 and P2 are at least partially directly and firmly bonded together in the presence of an adhesive between the two or of another layer.

It also means that there is no braid or tie layer, regardless of its composition, between the two layers (1) and (2).

According to one embodiment, said polymer P1 is chosen from polyamides, mixtures of polyamide and of polyolefin with a polyamide matrix, and EVOH.

According to one embodiment, said polymer P1 is chosen from polyamides and EVOH, in particular polyamides.

According to one embodiment, the polymer P1 is a semi-crystalline polyamide.

According to one embodiment, the polymer P2 is chosen from polyamides and polyolefins.

According to one embodiment, the polymer P2 is a semi-crystalline polyamide.

According to one embodiment, said polymer P1 is a semi-crystalline polyamide and said polymer P2 is chosen from polyamides and polyolefins.

According to one embodiment, said polymer P1 is chosen from polyamides and EVOH, in particular polyamides, and the polymer P2 is a semi-crystalline polyamide.

According to one embodiment, said polymer P1 is chosen from polyamides and EVOH, in particular polyamides, and said polymer P2 is chosen from polyamides and polyolefins.

According to one embodiment, the polymers P1 and P2 are semi-crystalline polyamides.

According to one embodiment, the polymer P2 is an amorphous polyamide.

According to one embodiment, the polymer P1 is a semi-crystalline polyamide and the polymer P2 is an amorphous polyamide.

According to one embodiment, the polymer P1 is an amorphous polyamide and the polymer P2 is a semi-crystalline polyamide.

Advantageously, the polymer P1 of the various embodiments above is a polyamide chosen from polyphthalamides, semi-aromatic polyamides, in particular A/T, A/10T, A/6T, XY/10T, XY/6T, PA6, PA66, PA6/66, PA610, PA612, a $C_4$ to $C_8$ short-chain polyamide, in particular resulting from the polymerization of lactams or $C_4$-$C_8$ aminocarboxylic acids, or from the polymerization of at least one diamine and at least one dicarboxylic acid, the average number of carbon atoms of which is from $C_4$ to $C_8$, a PA/polyolefin blend, it being possible for said polyolefin to be (totally or partially) functionalized or non-functionalized, in particular an Orgalloy®, A being a moiety resulting from the polycondensation of a lactam or of a $C_6$-$C_{12}$ amino acid, X corresponding to a moiety resulting from the polycondensation of an aliphatic, cycloaliphatic or aromatic diamine with an aliphatic, cycloaliphatic or aromatic dicarboxylic acid.

Advantageously, the polymer P1 of the various embodiments above is a polyamide chosen from polyphthalamides, semi-aromatic polyamides, in particular 11/10T, 612/10T, 11/6T, PA6, PA66, PA6/66, PA610, PA612, a $C_4$ to $C_8$ short-chain polyamide, in particular resulting from the polymerization of lactams or $C_4$-$C_8$ aminocarboxylic acids, or from the polymerization of at least one diamine and at least one dicarboxylic acid, the average number of carbon atoms of which is from $C_4$ to $C_8$, and a PA/polyolefin blend, it being possible for said polyolefin to be (totally or partially) functionalized or non-functionalized, in particular an Orgalloy®.

Advantageously, the polymer P1 of the various embodiments above is a polyamide chosen from semi-aromatic polyamides, in particular 11/10T, 612/10T, 11/6T, PA6, PA66, PA6/66, PA610, PA612, a $C_4$ to $C_8$ short-chain polyamide, in particular resulting from the polymerization of lactams or $C_4$-$C_8$ aminocarboxylic acids, or from the polymerization of at least one diamine and at least one dicarboxylic acid, the average number of carbon atoms of which is from $C_4$ to $C_8$, and a PA/polyolefin blend, it being possible for said polyolefin to be (totally or partially) functionalized or non-functionalized, in particular an Orgalloy®.

Advantageously, the polymer P2 of the various embodiments above is a polyamide, in particular chosen from polyphthalamides, and semi-aromatic polyamides, in particular 11/10T and 11/6T, PA11, PA12, PA6, PA66, PA6/66, PA610, PA612.

Advantageously, in the various embodiments above, the polymer P1 is chosen from a polyphthalamide, a semi-aromatic polyamide, in particular 11/10T, 612/10T, 11/6T, PA6, PA66, PA6/66, PA610, PA612, a $C_4$ to $C_8$ short-chain polyamide, in particular resulting from the polymerization of lactams or $C_4$-$C_8$ aminocarboxylic acids, or from the polymerization of at least one diamine and at least one dicarboxylic acid, the average number of carbon atoms of which is from $C_4$ to $C_8$, and a PA/polyolefin blend, it being possible for said polyolefin to be (totally or partially) functionalized or non-functionalized, in particular an Orgalloy®, and the polymer P2 is a polyamide, in particular chosen from polyphthalamides, and semi-aromatic polyamides, in particular 11/10T and 11/6T, PA11, PA12, PA6, PA66, PA6/66, PA610, PA612.

Advantageously, in the various embodiments above, the polymer P1 is chosen from a polyphthalamide, a semi-aromatic polyamide, in particular 11/10T, 612/10T, 11/6T, PA6, PA66, PA6/66, a $C_4$ to $C_8$ short-chain polyamide, in particular resulting from the polymerization of lactams or $C_4$-$C_8$ aminocarboxylic acids, or from the polymerization of at least one diamine and at least one dicarboxylic acid, the average number of carbon atoms of which is from $C_4$ to $C_8$, and a PA/polyolefin blend, it being possible for said polyolefin to be (totally or partially) functionalized or non-functionalized, in particular an Orgalloy®, with the exclusion of PA610 and PA612. Advantageously, in the various embodiments above, the polymer P1 is chosen from a semi-aromatic polyamide, in particular 11/10T, 612/10T, 11/6T, PA6, PA66, PA6/66, a $C_4$ to $C_8$ short-chain polyamide, in particular resulting from the polymerization of lactams or $C_4$-$C_8$ aminocarboxylic acids, or from the polymerization of at least one diamine and at least one dicarboxylic acid, the average number of carbon atoms of which is from $C_4$ to $C_8$, a PA/polyolefin blend, it being possible for said polyolefin to be (totally or partially) functionalized or non-functionalized, in particular an Orgalloy®, with the exclusion of PA610 and PA612.

Advantageously, in the various embodiments above, the polymer P1 and/or said polymer P2 comprise at least one tie.

Said tie is mixed either with P1, or with P2, or with P1 and P2, but does not constitute a tie layer between P1 and P2.

It is possible to use the ties described in documents EP 2098365 and EP 2098580, to which reference is expressly made herein.

In summary, the ties in question are compositions comprising at least one polyamide denoted A having an average number of carbon atoms per nitrogen atom denoted $C_A$ of from 4 to 8.5, advantageously from 4 to 7; at least one polyamide denoted B having a melting point greater than or equal to 180° C. and an average number of carbon atoms per nitrogen atom denoted $C_B$ of from 7 to 10, advantageously from 7.5 to 9.5; and at least one polyamide denoted C having an average number of carbon atoms per nitrogen atom denoted $C_C$ of from 9 to 18, advantageously from 10 to 18; at least 50% by weight of said composition being formed from one or more polyamides chosen from the polyamides A, B and C, the weighted mean by weight of the enthalpies of fusion of these polyamides within said composition being greater than 25 J/g (measured by DSC), and the average number of carbon atoms per nitrogen atom of the polyamides A, B and C also satisfying the following strict inequation: $C_A < C_B < C_C$.

The difference between the average numbers of carbon atoms per nitrogen atom ($C_B$-$C_A$) and/or ($C_C$-$C_B$) is advantageously from 1 to 4, and preferably from 2 to 3.

Each of the polyamides A, B and C advantageously has an enthalpy of fusion of greater than 25 J/g (measured by DSC).

The tie is used as additive in a layer of non-adhesive material.

According to one embodiment, the structure, defined in one of the embodiments above, comprises at least an exterior third layer (3), said layer being in contact with the layer (2) and comprising an elastomer and/or a polymer P3 which is identical to or different than P1 and which adheres at least partially to P2.

The expression "which adheres at least partially" has the same meaning as above.

Advantageously, the continuous fibers used in the embodiments above are chosen from:
mineral fibers,
carbon fibers or carbon nanotubes,
polymeric or polymer fibers,
or mixtures of the abovementioned fibers.

Advantageously, the mineral fibers are chosen from: silica fibers such as glass fibers, especially of E, R or S2 type; boron fibers; ceramic fibers, especially silicon carbide, boron carbide, boron carbonitride, silicon nitride, boron nitride; basalt fibers; fibers or filaments based on metals and alloys thereof; fibers based on metal oxides; metallized carbon fibers and metallized glass fibers or mixtures of the fibers mentioned.

Advantageously, the polymeric fibers are chosen from:
thermosetting-polymer fibers
thermoplastic-polymer fibers
fibers of polyamides corresponding to one of the following polyamides: 6, 66, 610, 612, 46, 410, 1010, 1012, 11 and 12
fibers of aramids and of aromatic polyamides such as those corresponding to one of the formulae: PPD.T, MPD.I, PAA and PPA
or mixtures of the abovementioned fibers.

Advantageously, the proportion by weight of fibers in P2 is from 30 to 80%, preferably from 50 to 70%.

Advantageously, the continuous fibers are glass fibers.

The glass fibers may or may not be sized, that is to say that, for example, the glass fibers are sized with a solution containing an alkoxysilane. They may for example be glass fibers treated by sizing with the same solution as that described in document JP H1 139628.

Advantageously, the refrigerant fluid used in one of the embodiments above is chosen from hydrocarbon, hydrofluorocarbon, ether, hydrofluoroether or fluoroolefin compounds, in particular from fluoropropenes, fluoropropanes and fluoroethanes; preferably from 1,3,3,3-tetrafluoropropene, 2,3,3,3-tetrafluoropropene, 1,2,3,3,3-pentafluoropropene, 1,1,3,3-tetrafluoropropene, 3,3,3-trifluoropropene, 2,3,3-trifluoropropene, 1,1,1,2-tetrafluoroethane, 1,1,2,2-tetrafluoroethane, pentafluoroethane, difluoromethane, 1,1-difluoroethane, 1,1,1,2,3,3,3-heptafluoropropane, 1,1,1-trifluoropropane, 1,1,1,3,3,3-hexafluoropropane, 1,1,1,3,3-pentafluoropropane, 1,1,1,3,3-pentafluorobutane, trifluoroiodomethane and mixtures comprising said compounds; and particularly preferably, said refrigerant fluid being 2,3,3,3-tetrafluoropropene (1234yf) or 1,3,3,3-tetrafluoropropene (1234ze).

Advantageously, the refrigerant fluid has added to it a lubricant, preferably chosen from mineral oils, silicone oils, paraffins of natural origin, naphthenes, synthetic paraffins, alkylbenzenes, poly-alpha-olefins, polyalkylene glycols, polyol esters and/or polyvinyl ethers; the lubricant being more particularly preferably a polyalkylene glycol or a polyol ester.

Advantageously, the lubricant is in proportion by weight of from 0.5 to 50%, in particular from 1 to 15% by weight.

According to one embodiment, the structure is a vapor-compression circuit element for containing or transporting a refrigerant fluid.

Vapor-Compression Circuit Element

The composition of the invention described above is used as layer in a vapor-compression circuit element.

A vapor-compression circuit comprises at least one evaporator, one compressor, one condenser and one expander, and also lines for transporting heat transfer fluid between these elements. The evaporator and the condenser comprise a heat exchanger which allows heat exchange between a heat transfer fluid, circulating in the circuit, and another fluid or body.

The piece of equipment can comprise an electricity-generating turbine (Rankine cycle).

The vapor-compression circuit can be integrated into a piece of equipment which can also optionally comprise at least one heat-transferring fluid circuit used to transmit the heat (with or without change of state) between the heat transfer fluid circuit and the fluid or body to be heated or cooled.

The piece of equipment can also optionally comprise two (or more) vapor-compression circuits comprising identical or distinct heat transfer fluids. For example, the vapor-compression circuits can be coupled to one another.

The vapor-compression circuit operates according to a conventional cycle of vapor compression. The cycle comprises the change of state of the heat transfer fluid from a liquid phase (or liquid/vapor dual phase) to a vapor phase at a relatively low pressure, then the compression of the fluid in vapor phase until a relatively high pressure is reached, the change of state (condensation) of the heat transfer fluid from the vapor phase to the liquid phase at a relatively high pressure, and the reduction of the pressure so as to recommence the cycle.

In the case of a cooling process, heat from the fluid or from the body that is being cooled (directly or indirectly, via a heat-transferring fluid) is absorbed by the heat transfer fluid, during the evaporation of the latter, this being at a relatively low temperature compared to the surroundings. The cooling processes comprise air-conditioning processes (with mobile pieces of equipment, for example in vehicles, or stationary pieces of equipment), refrigeration processes (with mobile pieces of equipment, for example in containers, or stationary pieces of equipment) and freezing or cryogenics processes.

In the case of a heating process, heat is transferred (directly or indirectly, via a heat-transferring fluid) from the heat transfer fluid, during the condensation thereof, to the fluid or to the body that is being heated, this being at a relatively high temperature compared with the surroundings. The piece of equipment which makes it possible to carry out the heat transfer is in this case called a "heat pump".

According to the present invention, the expression "vapor-compression circuit element" is intended to mean any part of such a circuit, comprising a lumen, said part being suitable for containing or transporting the heat transfer fluid.

The vapor-compression circuit element which is the subject of the present invention is preferably a pipe or piping (or even a hose). Alternatively, it may be a linkage or connector between pieces of piping, or between piping and compressor, or condenser, or heat exchanger, or else a part of a holding tank or of a thermal exchanger. The term "lumen" denotes the interior of said part of said circuit, in particular the interior of the pipe or of the piping or the interior of the linkage or connector.

The vapor-compression circuit element can also be a heat exchanger as such (in which case it comprises at least two lumina for the circulation of two identical or different fluids, one having to transfer heat to the other).

The heat transfer fluid can be obtained or transported in gas, liquid or two-phase form in the above circuit element.

The layer of composition according to the invention described above can in particular be a monolayer, or can be an internal layer (intended to come into contact with the heat transfer fluid) or an external layer (intended to be in contact with the environment) of the circuit element. This layer preferably constitutes an internal layer (or coating).

A subject of the invention is also a process for producing the structure as described above, comprising at least one step of extruding the layer (1).

According to one embodiment, the process for producing the structure as described above comprises the following successive steps:

a. producing said layer (1) by extrusion through a ring die, and
b. depositing, on said layer (1), said external layer (2) in the molten state using the technique of filament winding of fibers impregnated with polymer P2 in the molten state with one or more angles of orientation relative to the axis of said structure, and
c. cooling said structure.

A subject of the invention is also the use of a structure as described above, for transporting a refrigerant fluid in a vapor-compression circuit, in particular for transporting R-y 1234f or R-1234ze.

The present invention makes it possible to overcome the drawbacks of the prior art in that it provides a structure which makes it possible to satisfy the specifications in terms of properties of impermeability to the fluids transported (and in particular to refrigerant compounds such as R-1234yf or R-1234ze), and also to water and to oxygen, and of chemical resistance to the fluids transported, and also to water and to oxygen, and of mechanical, flexibility and thermal resistance properties, but especially to simplify the structures used, in terms of number of layers and of processing and to reduce the weight of these multilayer structures, and which is also easier to process and is lighter and therefore has less of an environmental impact.

Compared with the commercially available multilayer structures which are used at the current time as vapor-compression circuit elements for motor vehicle air-conditioning, the structures of the invention in particular have improved properties, allowing their use as a layer with improved properties in terms:

of barrier to heat transfer fluids (in particular R-1234yf and R-1234ze, but also R-134a for example); and/or
of dimensional stability to water; and/or
of barrier to water; and/or
of thermal and chemical resistance in the presence of R-1234yf or of R-1234ze and of lubricant, in particular of the PAG type; and/or
of long-term thermal resistance; and/or
of flexibility in the case where the two ends of the tube are connected to parts that can move relative to one another.

Moreover, the production of these structures comprising polymer layers, compared with the conventional rubber structures with an internal layer of polyamide, connected to aluminum structures, makes it possible to simplify the connections and to limit the risks of leakage.

It also allows a reduction in weight of the structures and a cost reduction.

The $T_g$ and the $T_m$ are conventionally measured by DSC (differential scanning calorimetry) according to the standard 11357-2 (2013) and the standard 11357-3 (2013), respectively. They are determined, in this case, during a temperature gradient of 20° C./min.

As will be described in detail below, the structure can comprise one or more polymers, organized in two or more layers. It can also comprise various additives and fillers (and in particular one or more elastomeric polymers blended with thermoplastic polymers and not affecting the thermoplastic nature of the compositions in question).
Said additives or fillers are different than the fibers.

DESCRIPTION OF EMBODIMENTS OF THE INVENTION

The invention is now described in greater detail and in a nonlimiting manner in the description which follows.
Thermoplastic Polymer P1 or P2
As regards the thermoplastic polymer, it may be semi-crystalline or amorphous.
When the thermoplastic polymer is P1, it is chosen from polyamides and EVOH, in particular it is a polyamide or a mixture of polyamides.
When the thermoplastic polymer is P2, it is chosen from polyamides and polyolefins.
As Regards the Polyamides or the Mixtures of Polyamides
The nomenclature used to define polyamides is described in the standard ISO 1874-1:1992 "Plastics—Polyamide (PA) molding and extrusion materials—Part 1: Designation", especially on page 3 (tables 1 and 2), and is well known to those skilled in the art.
The polyamide according to the present invention can have a homopolyamide or copolyamide structure.
Homopolyamide is understood to mean, within the meaning of the present invention, a polyamide which consists only of the repetition of a single unit.
Copolyamide is understood to mean, within the meaning of the present invention, a polyamide which consists of the repetition of at least two units of different chemical structure. This copolyamide can exhibit a random, alternating or block structure.
The polyamide according to the present invention can comprise one or more units with a structure chosen from amino acids, lactams and (diamine).(diacid) units.
When the polyamide comprises an amino acid in its structure, it can be chosen from 9-aminononanoic acid (A=9), 10-aminodecanoic acid (A=10), 10-aminoundecanoic acid (A=11), 12-aminododecanoic acid (A=12) and 11-aminoundecanoic acid (A=11) and its derivatives, in particular N-heptyl-11-aminoundecanoic acid, A denoting the number of carbon atoms in the unit.
When the polyamide comprises a lactam, it may be chosen from pyrrolidinone, 2-piperidinone, caprolactam, enantholactam, caprylolactam, pelargolactam, decanolactam, undecanolactam and lauryllactam (A=12).
When the polyamide comprised is a unit corresponding to the formula (Ca diamine).(Cb diacid), Ca and Cb denoting the number of carbon atoms respectively in the diamine and the diacid, the (Ca diamine) unit is chosen from linear or branched aliphatic diamines, cycloaliphatic diamines and alkylaromatic diamines.
When the diamine is aliphatic and linear, of formula H2N—(CH2)a-NH2, the (Ca diamine) monomer is preferably chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and diamines obtained from fatty acids.

When the diamine is aliphatic and branched, it can comprise one or more methyl or ethyl substituents on the main chain. For example, the (Ca diamine) monomer can advantageously be chosen from 2,2,4-trimethyl-1,6-hexanediamine, 2,4,4-trimethyl-1,6-hexanediamine, 1,3-diaminopentane, 2-methyl-1,5-pentanediamine or 2-methyl-1,8-octanediamine.

When the (Ca diamine) monomer is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), bis(p-aminocyclohexyl)methane (PACM), isopropylidenedi(cyclohexylamine) (PACP), isophoronediamine (a=10), piperazine (a=4) or aminoethylpiperazine. It can also comprise the following carbon backbones: norbornylmethane, cyclohexylmethane, dicyclohexylpropane, di(methylcyclohexyl) or di(methylcyclohexyl)propane. A nonexhaustive list of these cycloaliphatic diamines is given in the publication "Cycloaliphatic Amines" (Encyclopedia of Chemical Technology, Kirk-Othmer, 4th Edition (1992), pp. 386-405).

When the (Ca diamine) monomer is alkylaromatic, it is chosen from 1,3-xylylenediamine and 1,4-xylylenediamine.
The (Cb diacid) unit is chosen from linear or branched aliphatic diacids, cycloaliphatic diacids and aromatic diacids.

When the (Cb diacid) monomer is aliphatic and linear, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecenedioic acid (b=18), eicosanedioic acid (b=20), docosanedioic acid (b=22) and fatty acid dimers containing 36 carbons.

The fatty acid dimers mentioned above are dimerized fatty acids obtained by oligomerization or polymerization of unsaturated monobasic fatty acids bearing a long hydrocarbon chain (such as linoleic acid and oleic acid), as described in particular in the document EP 0 471 566.

When the diacid is cycloaliphatic, it can comprise the following carbon backbones: norbornylmethane, cyclohexylmethane, dicyclohexylmethane, dicyclohexylpropane, di(methylcyclohexyl) or di(methylcyclohexyl)propane.

When the diacid is aromatic, it is chosen from terephthalic acid (denoted T), isophthalic acid (denoted I) and naphthalenic diacids.

Advantageously, the proportion of polyamide P1 is at least 55% by weight.

Advantageously, the proportion of polyamide P2 is from 10 to 70% by weight, in particular from 20 to 50% by weight, preferably from 30 to 40% by weight.

Advantageously, the proportion of polyamide P1 is at least 55% by weight and the proportion of polyamide P2 is from 20 to 50% by weight, preferably from 30 to 40% by weight.

Advantageously, the proportion of polyamide P1 is at least 55% by weight and the proportion of polyamide P2 is from 10 to 70% by weight, in particular from 20 to 50% by weight, preferably from 30 to 40% by weight, and the proportion of fibers in P2 is from 30 to 80% by weight, in particular from 30 to 50% by weight.

Advantageously, said polyamide P1 is as defined above.
Advantageously, said polyamide P2 is as defined above.
Advantageously, P1 and P2 are identical.

The polyamide of the invention advantageously has a polydispersity index, denoted PDI, of less than or equal to 3.5. Preferably, the polydispersity index of said polyamide is from 2.0 to 3.0.

This index is measured conventionally and in a manner known to those skilled in the art, by size exclusion or gel permeation chromatography. Preferably, the polydispersity index of the polyamides of the invention is measured by gel permeation chromatography. More particularly, it is measured in a solvent appropriate for the polyamide, such as a fluorinated solvent, for instance hexafluoroisopropanol, at a temperature of from 20° C. to 50° C., preferably at 40° C.

While most of the starting monomers or products envisioned in the present description (amino acids, diamines, diacids) are saturated, there is nothing to prevent envisioning them possibly being partially unsaturated.

It will be noted, for example, that the C18 dicarboxylic acid may be octadecanedioic acid, which is saturated, or else octadecenedioic acid, which itself contains an unsaturation.

The polyamide of the invention may comprise monomers originating from resources derived from renewable raw materials, that is to say comprising organic carbon derived from biomass and determined according to the standard ASTM D6866. These monomers derived from renewable raw materials may be 1,10-decanediamine or, when they are present, in particular 11-aminoundecanoic acid or aliphatic and linear diamines and diacids as defined above The polyamides of the invention can be prepared by polycondensation of the comonomers defined above, for example in the presence of hypophosphorous acid or of at least one salt thereof.

The detailed description of such a polycondensation process appears in particular in document WO 2010/015786.

The polyamide of the invention preferably has an amine chain end content greater than or equal to 20 mmol/kg, an acid chain end content greater than or equal to 100 mmol/kg and a non-reactive chain end content greater than or equal to 20 mmol/kg.

The chain end content for each of the amine and acid functions and the non-reactive function is measured conventionally by NMR (Nuclear Magnetic Resonance).

In order to adjust the chain end content, it is possible to use chain-terminating agents, that is to say compounds capable of reacting with the amine and/or carboxylic acid end functions of the polyamides, thus stopping the reactivity of the end of the macromolecule, and therefore the polycondensation.

The chain-terminating agents suitable for reacting with the amine end function can be monocarboxylic acids, anhydride, such as phthalic anhydride, monohalogenated acids, monoesters or monoisocyanates. Preferably, monocarboxylic acids are used. They can be chosen from monocarboxylic aliphatic acids, such as acetic acid, propionic acid, lactic acid, valeric acid, caproic acid, capric acid, uric acid, tridecylic acid, myristic acid, palmitic acid, stearic acid, pivalic and isobutyric acid; alicyclic acids, such as cyclohexanecarboxylic acid; monocarboxylic aromatic acids such as toluic acid, α-naphthalenecarboxylic acid, β-naphthalenecarboxylic acid, methylnaphthalenecarboxylic acid, phenylacetic acid; and mixtures thereof. The preferred compounds are aliphatic acids, and in particular acetic acid, propionic acid, lactic acid, valeric acid, caproic acid, capric acid, lauric acid, tridecylic acid, myristic acid, palmitic acid and stearic acid.

Among the chain-terminating agents suitable for reacting with the acid end function, mention may be made of monoamines, monoalcohols and monoisocyanates. Monoamines are preferably used. They can be chosen from aliphatic monoamines, such as methylamine, ethylamine, propylamine, butylamine, hexylamine, octylamine, decylamine, laurylamine, stearylamine, dimethylamine, diethylamine, dipropylamine and dibutylamine; alicyclic amines, such as cyclohexylamine and dicyclohexylamine; aromatic monoamines, such as aniline, toluidine, diphenylamine and naphthylamine; and mixtures thereof.

The preferred compounds are butylamine, hexylamine, octylamine, decylamine, laurylamine, stearylamine, cyclohexylamine and aniline.

It is also possible to react the acid and/or amine ends, respectively, with inorganic bases such as alkali metal or alkaline-earth metal hydroxides, such as potassium hydroxide and sodium hydroxide, and with inorganic acids such as HCl, $HNO_3$ and $H_2SO_4$.

The chain-terminating agents can be introduced during the first and/or the second step, in the case of the two-step production processes described above. For further details, reference is made herein to document WO 2010/015785.

As Regards the Polyolefins

The polyolefin may be functionalized or nonfunctionalized or be a mixture of at least one functionalized and/or at least one nonfunctionalized, with an Mp greater than 100° C.

The term "polyolefin" is intended to mean a homopolymer or copolymer comprising one or more olefin moieties, such as ethylene, propylene, 1-butene, 1-octene or butadiene moieties, or any alpha-olefin. By way of example of a polyolefin, mention may be made of polyethylene and in particular low-density polyethylene (LDPE), high-density polyethylene (HDPE), linear low-density polyethylene (LLDPE) and very low-density polyethylene (VLDPE); polypropylene; ethylene/propylene copolymers; or else metallocene polyethylenes obtained by single-site catalysis.

Copolymers of ethylene and of EVA (with an Mp greater than 100° C.) are also preferred.

Additives

It is possible to add, to the polyamide P1 and/or P2 and/or to the polyolefin, resulting from the process for production thereof, in addition to the remainder made up of diamine, usual additives as defined hereinafter as a function of the layer in which they are present.

Polymer P1

The polymer P1 can comprise at least one additive chosen from an antioxidant, a heat stabilizer, a UV absorber, a light stabilizer, a lubricant, a filler, a flame retardant, a nucleating agent, a plasticizer, an impact modifier and a dye.

The fibers are excluded from the additives, and in particular the term "filler" excludes the fibers.

Preferably, the additives of the polyamide P1 of the invention are in an amount of from 1 to 45%, preferably from 5 to 45% or from 15 to 45%, by weight, relative to the weight of the composition present in P1.

The expression "impact modifier" should be understood as meaning a polymer based on polyolefin with a flexural modulus of less than 100 MPa measured according to standard ISO-178:2010 and a Tg of less than 0° C. (measured according to standard 11357-2:2013 at the inflection point of the DSC thermogram).

The polyolefin may be functionalized or non-functionalized.

When the polyolefin is functionalized, a portion or all of the polyolefins bears a function chosen from carboxylic acid, carboxylic anhydride and epoxide functions, and is in particular chosen from a copolymer of ethylene and propylene with elastomeric character (EPR), an ethylene-propylene-diene copolymer with elastomeric character (EPDM) and an ethylene/alkyl (meth)acrylate copolymer, an ethylene-higher alkene copolymer, in particular an ethylene-octene copolymer, or an ethylene-alkyl acrylate-maleic anhydride terpolymer.

The plasticizer used as additive in the polymer P1 is advantageously a plasticizer which has good thermal stability so that it does not form fumes during the steps of blending of the various polymers and of transformation of the composition obtained.

In particular, this plasticizer can be chosen from:
benzene sulfonamide derivatives, such as n-butylbenzenesulfonamide (BBSA), the ortho and para isomers of ethyltoluenesulfonamide (ETSA), N-cyclohexyltoluenesulfonamide and N-(2-hydroxypropyl)benzenesulfonamide (HP-BSA),
hydroxybenzoic acid esters, such as 2-ethylhexl-para-hydroxybenzoate (EHPB) and 2-decylhexyl-para-hydroxybenzoate (HDPB),
esters or ethers of tetrahydrofurfuryl alcohol, such as oligoethyleneoxytetrahydrofurfuryl alcohol, and
esters of citric acid or of hydroxymalonic acid, such as oligoethyleneoxymalonate.

A plasticizer that is preferred, since it is commonly used, is n-butylbenzenesulfonamide (BBSA).

Use may also be made of a mixture of plasticizers.

The plasticizer used as additive in the polymer P1 is in a weight proportion of from 0 to 15%, more particularly preferably from 0 to 8%.

Advantageously, the polymer P1 comprises an impact modifier and a plasticizer.

The heat stabilizer used as additive in the polymer P1 may be present in an amount of from 0 to 4%, in particular from 0.01 to 2% or from 0.1 to 1% by weight relative to the total weight of the composition of polymer P1.

It may be an organic or copper-based heat stabilizer.

More particularly, it may be a copper salt or a copper salt derivative, for example copper iodide, copper bromide, copper halides, or derivatives or mixtures thereof. The copper I salts are preferred. Examples are copper iodide, copper bromide, copper chloride, copper fluoride, copper thiocyanate, copper nitrate, copper acetate, copper naphthenate, copper caprate, copper laurate, copper stearate, copper acetylacetonate, and copper oxide. Copper iodide, copper bromide, copper chloride and copper fluoride are preferred.

It may also be envisioned to use, by way of heat stabilizers, a metal halide salt in combination with LiI, NaI, KI, $MgI_2$, KBr or $CaI_2$. KI and KBr are preferred.

Other possible heat stabilizers are sterically hindered phenolic antioxidants. These compounds are described in detail in document U.S. 2012/0279605, in paragraphs [0025] and [0026], to which reference is expressly made herein.

However, according to an alternative embodiment, the composition of the invention is devoid of such hindered phenolic antioxidants.

A secondary antioxidant of phosphite type can also be used.

Another category of possible stabilizers are sterically hindered amine-based UV stabilizers (or HALS), which are derivatives of 2,2,6,6-tetramethylpipridine. They can be used, for example, in a range of from 0 to 1% or from 0.01 to 0.5%.

Among the dyes, mention may particularly be made of carbon black. The dyes or pigments (for the purpose of coloring the composition) can be present for example in an amount of from 0.1 to 0.2% by weight.

Among the fillers, mention may be made of silica, graphite, expanded graphite, carbon black, glass beads, kaolin, magnesia, slag, talc, metal oxides (titanium oxide), metals.

The fillers such as expanded graphite for example can make it possible to increase the thermal conductivity of the material (for example in order to promote heat exchange between a lumen of a tube comprising a layer of composition of the invention and the exterior, or between two lumina of a tube comprising a layer of composition of the invention).

Polymer P2

The polymer P2 can comprise: additives which absorb in the UV or IR range so as to allow welding of the composite obtained, by a laser technology (UV or IR), heat stabilizers chosen from antioxidants of sterically hindered phenol or sterically hindered amine (HALS) type and impact modifiers. The function of these stabilizers is to prevent thermal oxidation, photooxidation and consequent degradation of the matrix polyamide of the composite obtained.

A secondary antioxidant of phosphite type can also be used.

The heat stabilizers and the secondary antioxidant are as defined for the polymer P1.

However, one and/or the other of the layers (polymer P1 and/or P2) of the structure of the invention can also comprise other compounds, other than those that have just been mentioned. The composition of the invention (polymers P1 and/or P2) can in particular also comprise at least one additional additive and/or at least one additional polymer.

The additional additives can in particular be chosen from processing aids.

Among the processing aids, mention may be made of stearates, such as calcium or zinc stearates, natural waxes, and polymers comprising tetrafluoroethylene (TFE).

The weight proportion of processing aids is conventionally from 0.01 to 0.3% by weight, advantageously from 0.02 to 0.1% by weight, relative to the total weight of the composition.

The one and/or the other of the layers of the structure of the invention can also comprise one or more additional polymers, such a polymer being distinct from the polymer mentioned above. Alternatively, one and/or the other of the layers of the structure of the invention may be devoid of such an additional polymer.

The additional polymer can in particular be chosen from a polyamide other than that defined previously, a polyamide-block-ether, a polyetheramide, a polyesteramide, a polyphenylene sulfide (PPS), a polyphenylene oxide (PPO), and mixtures thereof.

The composition can thus contain up to 20% by weight, relative to the total weight of the composition, of at least one additional polymer.

Tubular Structure

The tubular structure which is the subject of the invention can in particular be a tube or a pipe, or else a piece of connection or of linkage between tubes, or between a tube and a device (such as a compressor, a condenser or a heat exchanger for example).

The tubular structure may be formed of a single layer made up of the composition described above.

The total thickness of the structure of the assembly of layers can for example range from 0.5 mm to 5 mm, preferably from 1 mm to 3 mm.

The use of the tubular structures according to the invention makes it possible to simplify the circuit design, by allowing easy connection by welding (for example rotation welding, ultrasonic welding, laser welding or induction welding).

Application to a Vapor-Compression Circuit

A vapor-compression circuit comprises at least one evaporator, one compressor, one condenser and one expander, and also lines for transporting heat transfer fluid between these elements. The evaporator and the condenser comprise a heat exchanger which allows heat exchange between a heat transfer fluid, circulating in the circuit, and another fluid or body.

The piece of equipment can comprise an electricity-generating turbine (Rankine cycle).

The vapor-compression circuit can be integrated into a piece of equipment which can also optionally comprise at least one heat-transferring fluid circuit used to transmit the heat (with or without change of state) between the heat transfer fluid circuit and the fluid or body to be heated or cooled.

The piece of equipment can also optionally comprise two (or more) vapor-compression circuits comprising identical or distinct heat transfer fluids. For example, the vapor-compression circuits can be coupled to one another.

The vapor-compression circuit operates according to a conventional cycle of vapor-compression. The cycle comprises the change of state of the heat transfer fluid from a liquid phase (or liquid/vapor dual phase) to a vapor phase at a relatively low pressure, then the compression of the fluid in vapor phase until a relatively high pressure is reached, the change of state (condensation) of the heat transfer fluid from the vapor phase to the liquid phase at a relatively high pressure, and the reduction of the pressure so as to recommence the cycle.

In the case of a cooling process, heat from the fluid or from the body that is being cooled (directly or indirectly, via a heat-transferring fluid) is absorbed by the heat transfer fluid, during the evaporation of the latter, this being at a relatively low temperature compared to the surroundings. The cooling processes comprise air-conditioning processes (with mobile pieces of equipment, for example in vehicles, or stationary pieces of equipment), refrigeration processes (with mobile pieces of equipment, for example in containers, or stationary pieces of equipment) and freezing or cryogenics processes.

In the case of a heating process, heat is transferred (directly or indirectly, via a heat-transferring fluid) from the heat transfer fluid, during the condensation thereof, to the fluid or to the body that is being heated, this being at a relatively high temperature compared with the surroundings. The piece of equipment which makes it possible to carry out the heat transfer is in this case called a "heat pump".

A thermoplastic structure according to the invention can be used as "vapor-compression circuit element", that is to say as a part of such a circuit comprising. Such a part comprises a lumen suitable for containing or transporting the heat transfer fluid.

The vapor-compression circuit element in question is preferably a pipe or piping (or even a hose). Alternatively, it may be a linkage or connector between pieces of piping, or between piping and compressor, or condenser, or heat exchanger, or else a part of a holding tank or of a thermal exchanger. The vapor-compression circuit element can also be a heat exchanger as such (in which case it comprises at least two lumina for the circulation of two identical or different fluids, one having to transfer heat to the other).

The heat transfer fluid can be contained or transported in gas, liquid or two-phase form in the above circuit element.
Production of the Thermoplastic Materials of the Structure of the Invention The various layers of the structure of the invention can be prepared by any method which makes it possible to obtain a homogeneous mixture, such as melt extrusion.

More particularly, they can be prepared by melt-mixing of the polyamide(s), optionally of the plasticizer(s) and optionally of the products for obtaining the crosslinked polyolefin(s).

The optional additives and/or additional polymers can, for their part, be introduced either at the same time as the crystalline polyamide(s), plasticizer(s) and products for obtaining the crosslinked polyolefin(s), or during a subsequent step.

Advantageously, the composition can be obtained in the form of granules by compounding, in particular by means of a twin-screw extruder, of a co-kneader or of an internal mixer.

Heat Transfer Fluid

The term "heat transfer compound", respectively "heat transfer fluid" (or refrigerant fluid or refrigerant), is intended to mean a compound, respectively a fluid, capable of absorbing heat by evaporating at low temperature and low pressure and of providing heat by condensing at high temperature and high pressure, in a vapor-compression circuit. In general, a heat transfer fluid can comprise just one, two, three or more than three heat transfer compounds.

In addition, the heat transfer fluid can optionally comprise one or more additives which are not heat transfer compounds for the envisioned application.

The heat transfer compounds may be hydrocarbon, ether, hydrofluoroether, hydrofluorocarbon or fluoroolefin compounds or HFO. Hydrofluorocarbons and fluoroolefins are preferred, and more particularly fluoroolefins. Fluoropropenes, fluoropropanes and fluoroethanes are preferred.

Examples of preferred heat transfer compounds, used individually or as a mixture, are 1,3,3,3-tetrafluoropropene (R-1234ze), 2,3,3,3-tetrafluoropropene (R-1234yf), 1,2,3,3,3-pentafluoropropene (R-1225ye), 1,1,3,3-tetrafluoropropene (R-1234zc), 3,3,3-trifluoropropene (R-1243zf), 2,3,3-trifluoropropene (R-1243yf), 1,1,1,2-tetrafluoroethane (R-134a), 1,1,2,2-tetrafluoroethane (R-134), pentafluoroethane (R-125), difluoromethane (R-32), 1,1-difluoroethane (R-152a), 1,1,1,2,3,3,3-heptafluoropropane (R-227ea), 1,1,1-trifluoropropane (R-263), 1,1,1,3,3,3-hexafluoropropane (R-236fa), 1,1,1,3,3-pentafluoropropane (R-245fa), 1,1,1,3,3-pentafluorobutane (R-365mfc) and trifluoroiodomethane.

The above compounds can also be used as a mixture with ammonia or carbon dioxide.

According to one preferred embodiment, the heat transfer fluid is R-134a or R-1234yf or R-1234ze, the latter being particularly preferred.

Mixtures of R-1234yf or R-1234ze and of ammonia and R-1234yf or R-1234ze and of carbon dioxide are also particularly preferred for stationary air-conditioning.

The additives can in particular be chosen from lubricants, nanoparticles, stabilizers, surfactants, trace agents, fluorescent agents, odorizing agents and dissolving agents.

The stabilizer(s), when they are present, preferably represent at most 5% by weight in the heat transfer composition. Among the stabilizers, mention may in particular be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, eoxides (alkyl which is optionally fluorinated or perfluorinated or alkenyl ou aromatic) such as n-butyl glycidyl ether, hexanediol diglycidyl ether, allyl glycidyl ether, butylphenylglycidyl ether, phosphites, phosphonates, thiols and lactones.

By way of lubricants, use may in particular be made of oils of mineral origin, silicone oils, paraffins of natural origin, naphthenes, synthetic paraffins, alkylbenzenes, poly-alpha-olefins, polyalkylene glycols (PAGs), polyol esters and/or polyvinyl ethers.

According to the invention, it is particularly preferred for the heat transfer fluid circulating in the vapor-compression circuit to comprise a PAG lubricant or POE lubricant.

According to one particularly preferred embodiment of the invention, the heat transfer fluid is R-1234yf or R-1234ze to which has been added a PAG lubricant (and optionally additional additives).

Among the PAG lubricants, it is in particular possible to use those which are described in document U.S. 2010/0282999, to which reference is expressly made herein. These lubricants correspond to the formula $R_1$—$(OR_3)_n$—$R_2$, in which $R_1$ and $R_2$ are identical or different and represent a hydrogen atom, a $C_1$-$C_5$ alkyl group or a $C_2$-$C_5$ acryl group, $R_3$ represents a $C_2$-$C_4$ alkylene group, and the molar proportion of $C_2$ alkylene groups in the $R_3$ moieties is at most 30%. The hydroxyl number is preferably at most 100 mg KOH/g, or 50, 30 or 10 mg KOH/g. The number molecular weight of the PAG is preferably from 500 to 3000, or from 600 to 2000, or from 600 to 1500.

Among the PAG lubricants, it is also possible to use those which are described in document U.S. 2010/0175421, to which reference is expressly made herein. These lubricants correspond to the formula $R_1$—$[(OR_2)_m$—$R_3]_n$, in which $R_1$ represents a hydrogen atom, a hydrocarbon-based group having 1 to 10 carbon atoms, an acyl group having 2 to 10 carbon atoms, a hydrocarbon-based group having 2 to 6 bonding sites and 1 to 10 carbon atoms or a hydrocarbon-based group containing an oxygen atom and having 1 to 10 carbon atoms, $R_2$ represents an alkylene group having 2 to 4 carbon atoms, $R_3$ represents a hydrogen atom, a hydrocarbon-based group having 1 to 10 carbon atoms, an acyl group having 2 to 10 carbon atoms, or a hydrocarbon-based group containing an oxygen atom and having 1 to 10 carbon atoms, n represents an integer from 1 to 6 and m is a number such that the mean value m×n is from 6 to 80. Examples of such PAGs are polypropylene glycol dimethyl ether, the copolymer of polyethylene-polypropylene glycol dimethyl ether, the copolymer of polyethylene-polypropylene glycol methyl butyl ether and propylene glycol diacetate. The hydroxyl number is preferably 5 mg KOH/g or less, or 3 mg KOH/g or less, or 1 mg KOH/g or less. The number molecular weight of the PAG is preferably from 500 to 3000, or from 600 to 2500.

Among the PAG lubricants, it is also possible to use those which are described in document WO 2010/075046, to which reference is expressly made herein. These lubricants correspond to the formula $RX(R_aO)_x(R_bO)_yR_c$, in which R is chosen from alkyl groups having from 1 to 10 carbon atoms, aliphatic hydrocarbon-based groups having from 2 to 6 valences, and substituents comprising a heterocycle in which the heteroatom(s) are oxygen, X is chosen from O and S, $R_a$ is a C2 alkylene group, $R_b$ is a C3 alkylene group, R, is identical to R or represents H, x and y are equal to 0 or an integer lower than or equal to 100, independently. The sum x+y is an integer from 5 to 100. The aliphatic hydrocarbon-based groups comprise in particular alkanes, alkenes, alkynes, and in particular methyl, butyl and propyl groups. The lubricant may be a linear oxypropylene homopolymer. Alkoxy ends, and in particular methoxy ends, are preferred. The kinematic viscosity is preferably at least 30 cSt, or 20 cSt, or 10 cSt at 40° C., or a viscosity index of at least 150, or 120 or 100. The total acid number is preferably less than 0.03, or 0.02, or 0.01 mg KOH/g.

By way of nanoparticles, use may in particular be made of charcoal nanoparticles, metal (copper, aluminum) oxides, $TiO_2$, $Al_2O_3$, $MoS_2$, etc.

By way of tracers (capable of being detected), mention may be made of deuterated or non-deuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer is different than the heat transfer compound(s) making up the heat transfer fluid.

By way of dissolving agents, mention may be made of hydrocarbons, dimethyl ether, polyalkylene ethers, amides, ketones, nitriles, chlorocarbons, esters, lactones, aryl ethers, fluoroethers and 1,1,1-trifluoroalkanes. The dissolving agent is different than the heat transfer compound(s) making up the heat transfer fluid.

By way of fluorescent agents, mention may be made of naphthalimides, perylenes, coumarins, anthracenes, phenanthracenes, xanthenes, thioxanthenes, naphthoxanthenes, fluoresceins and derivatives and combinations thereof.

By way of odorizing agents, mention may be made of alkyl acrylates, allyl acrylates, acrylic acids, acryl esters, alkyl ethers, alkyl esters, alkynes, aldehydes, thiols, thioethers, disulfides, allylisothiocyanates, alkanoic acids, amines, norbornenes, norbornene derivatives, cyclohexene, heterocyclic aromatic compounds, ascaridole, o-methoxy (methyl) phenol and combinations thereof.

As regards motor vehicle air-conditioning, it is preferred to use a single heat transfer compound (rather than a mixture) and a single lubricant (rather than a mixture), for reasons of stability in the vapor-compression circuit.

Example

Example 1—Properties of Permeability to Fluorinated Refrigerants

In this example, the permeability to fluorinated refrigerants (R-1234yf) of a tubular structure (according to the invention) consisting of a composition comprising a copolyamide of formula 11/10T as internal layer (polymer P1) and of a composition comprising a polyamide of formula PA610 with fibers (6% by weight of glass fibers) as external layer (polymer P2) is compared with a standard tubular structure of Veneer type comprising either 200 or 300 microns of impact-modified PA 6, corresponding to the product sold by DuPont under the name Zytel® ST 811.

The flow measurements were carried out on films having the same composition as the layers of the tubular structures, with a permeation cell, by Lyssy GPM500/GC coupling at a temperature of 23° C. and 0% relative humidity. The upper face of the cell is swept with the testing gas, and the flow diffusing through the film in the lower part is measured by gas chromatography. Helium is used as vector gas sweeping the lower part.

The permeation of the tubular structures is calculated by the usual law of permeation of a multilayer, namely $e/P = \Sigma ei/Pi$ e and P are the thickness and the permeability of the multilayer structure ei and Pi are the thicknesses and the permeability is of each of the layers of the structure.

The results of the calculations are reproduced in table 1 below. The flows of refrigerants are expressed in $cm^3/m^2/24\ h/atm$.

TABLE 1 results for R-1234yf

|  | Flow |
|---|---|
| Veneer structure with 0.2 mm of Zytel® ST 811 | 0.0025 |
| Veneer structure with 0.3 mm of Zytel® ST 811 | 0.0017 |
| Structure according to the inventionn P2/P1 (mm), 0.2/1 | <0.00025 |

The structure of the invention is a better barrier to R-1234yf than the Veneer structure.

The invention claimed is:

1. A tubular structure for transporting heat transfer fluid, comprising at least:
  i) a layer (1) in contact with the fluid comprising at least one thermoplastic polymer P1 which is semi-crystalline with a $Tm_1$ greater than or equal to 160° C., as determined according to the standard 11357-3 (2013), or which is amorphous with a $Tg_1$ greater than or equal to 100° C., as determined according to the standard 11357-2 (2013), said layer (1) being devoid of fibers,
  ii) a layer (2) comprising at least:
    (a) a thermoplastic polymer P2 which is semi-crystalline, or which is amorphous with a $Tg_2$ greater than or equal to 100° C., or a polyolefin with a Tm greater than 100° C.;
    (b) continuous fibers,
  the polymer P2 being identical to P1 or different than P1, in which case the polymers P1 and P2 adhere at least partially to one another.

2. The structure as claimed in claim 1, wherein said polymer P1 is chosen from polyamides and EVOH.

3. The structure as claimed in claim 1, wherein said polymer P1 is a semi-crystalline polyamide.

4. The structure as claimed in claim 1, wherein said polymer P2 is chosen from polyamides and polyolefins.

5. The structure as claimed in claim 1, wherein said polymer P2 is a semi-crystalline polyamide.

6. The structure as claimed in claim 1, wherein said polymers P1 and P2 are semi-crystalline polyamides.

7. The structure as claimed in claim 1, wherein said polymer P2 is an amorphous polyamide.

8. The structure as claimed in claim 1, wherein said polymer P1 is a polyamide chosen from polyphthalamides, semi-aromatic polyamides, particular A/T, A/10T, A/6T, XY/10T, XY/6T, PA6, PA66, PA6/66, PA610, PA612, a $C_4$ to $C_8$ short-chain polyamide, or from the polymerization of at least one diamine and at least one dicarboxylic acid, the average number of carbon atoms of which is from $C_4$ to $C_8$, and a PA/polyolefin blend, it being possible for said polyolefin to be (totally or partially) functionalized or non-functionalized.

9. The structure as claimed in claim 8, characterized in that said polymer P1 is a polyamide chosen from polyphthalamides, semi-aromatic polyamides, a $C_4$ to $C_8$ short-chain polyamide, and a PA/polyolefin blend, it being possible for said polyolefin to be functionalized or non-functionalized.

10. The structure as claimed in claim 8, wherein said polymer P1 is a polyamide chosen from semi-aromatic polyamides, a $C_4$ to $C_8$ short-chain polyamide, and a PA/polyolefin blend, it being possible for said polyolefin to be functionalized or non-functionalized.

11. The structure as claimed in claim 8, wherein said polymer P1 is a polyamide chosen from polyphthalamides, semi-aromatic polyamides, a $C_4$ to $C_8$ short-chain polyamide, and a PA/polyolefin blend, it being possible for said polyolefin to be functionalized or non-functionalized, with the exclusion of PA610 and PA612.

12. The structure as claimed in claim 8, wherein said polymer P1 is a polyamide chosen from semi-aromatic polyamides, a $C_4$ to $C_8$ short-chain polyamide, and a PA/polyolefin blend, it being possible for said polyolefin to be functionalized or non-functionalized, with the exclusion of PA610 and PA612.

13. The structure as claimed in claim 1, wherein said polymer P2 is a polyamide chosen from polyphthalamides, semi-aromatic polyamides, and 11/6T, PA11, PA12, PA6, PA66, PA6/66, PA610 and PA612.

14. The structure as claimed in claim 1, wherein said polymer P1 and/or said polymer P2 comprise at least one tie.

15. The structure as claimed in claim 1, wherein it comprises at least an exterior third layer (3), said layer being in contact with the layer (2) and comprising an elastomer and/or a polymer P3 which is identical to or different than P1 and which adheres at least partially to P2.

16. The structure as claimed in claim 1, wherein the continuous fibers are chosen from:
  mineral fibers,
  carbon fibers and carbon nanotubes,
  polymeric or polymer fibers,
  or mixtures of the abovementioned fibers.

17. The structure as claimed in claim 1, wherein:
  the mineral fibers are chosen from: silica fibers; boron fibers; ceramic fibers; basalt fibers; fibers or filaments based on metals and alloys thereof; fibers based on metal oxides; metallized carbon fibers and metallized glass fibers or mixtures of the fibers mentioned,
  and
  the polymeric fibers are chosen from:
    thermosetting-polymer fibers
    thermoplastic-polymer fibers
    fibers of polyamides corresponding to one of the following polyamides: 6, 66, 610, 612, 46, 410, 1010, 1012, 11 and 12
    fibers of aramids and of aromatic polyamides such as those corresponding to one of the formulae: PPD.T, MPD.I, PAA and PPA
    or mixtures of the abovementioned fibers.

18. The structure as claimed in claim 1, wherein the proportion by weight of fibers in the layer comprising P2 is from 30 to 80%.

19. The structure as claimed in claim 1, wherein the refrigerant fluid is chosen from hydrocarbon, hydrofluorocarbon, ether, hydrofluoroether or fluoroolefin compounds.

20. The structure as claimed in claim 1, wherein the refrigerant fluid has added to it a lubricant.

21. The structure as claimed in claim 20, wherein said lubricant is in a proportion by weight of from 0.5% to 50%.

22. The structure as claimed in claim 1, which is a vapor-compression circuit element for containing or transporting a refrigerant fluid, said vapor-compression circuit element.

23. The structure as claimed in claim 1, wherein the vapor-compression circuit is integrated into a device chosen from mobile or stationary air-conditioning devices, refrigeration devices, freezing devices, devices for heating by heat pump and Rankine cycles.

24. A process for producing the structure as claimed in claim 1, wherein it comprises at least one step of extruding the layer (1).

25. The production process as claimed in claim 24, wherein it comprises the following successive steps:
   a. producing said layer (1) by extrusion through a ring die, and
   b. depositing, on said layer (1), said external layer (2) in the molten state using the technique of filament winding of fibers impregnated with polymer P2 in the molten state with one or more angles of orientation relative to the axis of said structure, and
   c. cooling said structure.

26. The use of a thermoplastic structure as claimed in claim 1, for transporting a refrigerant fluid in a vapor-compression circuit.

* * * * *